United States Patent [19]

Bonis et al.

[11] 3,878,282

[45] Apr. 15, 1975

[54] PROCESS FOR MOLDING MULTILAYER ARTICLES

[75] Inventors: Lazlo J. Bonis, Brookline; Ralph J. Abramo, Holliston, both of Mass.

[73] Assignee: Ilikon Corporation, Natick, Mass.

[22] Filed: Aug. 3, 1973

[21] Appl. No.: 385,595

Related U.S. Application Data

[63] Continuation-in-part of Ser. No. 170,556, Aug. 10, 1971, abandoned.

[52] U.S. Cl. .................. 264/97; 264/237; 264/255; 425/DIG. 209; 425/DIG. 234
[51] Int. Cl. ...... B29c 17/07; B29c 25/00; B29f 1/10
[58] Field of Search ............... 264/97, 89, 245–246, 264/255, 237, 348, 327; 425/242 B, 324 B, 326 B, DIG. 209, 208, 214, DIG. 234

[56] References Cited

UNITED STATES PATENTS

| 2,331,702 | 10/1943 | Kopitke | 264/97 |
| 3,363,039 | 1/1968 | Nagai et al. | 264/245 |

FOREIGN PATENTS OR APPLICATIONS

| 1,950,212 | 4/1971 | Germany | 264/97 |
| 45-40435 | 12/1970 | Japan | 264/97 |
| 1,190,351 | 5/1970 | United Kingdom | |

*Primary Examiner*—Jan H. Silbaugh
*Attorney, Agent, or Firm*—George H. Gerstman

[57] ABSTRACT

A multi-layer molded article is formed by injection molding two thermoplastic materials onto a mandrel, each in a separate injection molding step to form a multi-layer parison. The parison is then blow molded, cooled and removed from the mandrel. Prior to injection of the second thermoplastic material, the first layer parison is cooled to a temperature below its normal working range so that injection of the second layer on top of the first layer will not erode the first layer.

The aforementioned Abstract is neither intended to define the invention of the application which, of course, is measured by the claims, nor is it intended to be limiting as to the scope of the invention in any way.

7 Claims, 3 Drawing Figures

PROCESS FOR MOLDING MULTILAYER ARTICLES

CROSS REFERENCE TO RELATED APPLICATION

This invention is a continuation-in-part of U.S. Pat. application Ser. No. 170,556 filed Aug. 10, 1971, and now abandoned.

BACKGROUND OF THE INVENTION

This invention relates to a process for molding multi-layer articles from thermoplastic materials.

At the present time, the use of thermoplastic materials for forming containers for food, particularly beverages, has been severely limited. A primary reason for this is that thermoplastic materials capable of providing an adequate seal between the food and atmosphere are relatively expensive to a degree which has not permitted their economic use in present container forming processes at a thickness required to attain the needed structural strength characteristics for the container.

A typical example is carbonated beverages. Since most plastics are poor barriers to carbon dioxide diffusion, only specially formulated polymers can be used, and these are inherently too expensive to be used except for very special purposes. However, a two-layer wall, consisting of a thin, inner layer of the barrier material, backed by a thicker layer of inexpensive material, such as polystyrene or polypropylene, will be satisfactory. The raw materials cost will make such a container competitive with glass and considerably less expensive than a bottle made entirely from a barrier material.

Another example of the usage of the multi-layer principle would be the combination of a material having good barrier properties for water vapor diffusion with a material having low oxygen permeability. If there is little difference in cost between the two materials, the layers could be of equal thickness, or in a ratio indicated by ease of manufacturing. It may also, in some cases, be advantageous to have a thin barrier layer on the outside rather than on the inside of a two-layer container, provided the content is compatible with the inner (thick in this case) layer. Another application is where an outside and an inside film encloses a middle layer of recycled, inexpensive plastic, to bury it and to gain from its low cost.

These are but some of many cases where two or more materials together can perform a function that no single material could. It is, therefore, obviously desirable to develop a method for the production of plastic bottles and containers having a composite wall, consisting of two or more layers of different materials. Physical or chemical bonding between the layers is generally unnecessary and may be considered undesirable.

Thus, it is an object of the present invention to provide a process for forming multi-layer containers wherein an adequate barrier can be attained.

A further object of the present invention is to provide an injection blow molding process for multi-layer articles.

Another object of the present invention is to provide an injection blow molding process for multi-layer articles which process includes a step for preventing erosion of a lower layer parison when the next layer is injected on top of the lower layer.

Another object of the present invention is to provide an injection blow molding process for multi-layer articles which includes a cooling step between layer injections so as to aid in preventing chemical bonding between the layers.

Further objects and advantages of the present invention will become apparent as the description proceeds.

BRIEF DESCRIPTION OF THE INVENTION

The present invention concerns a continuous injection-blow molding process for forming multi-layer, structurally strong containers. The process comprises four or more steps in one continuous operation, using a single apparatus. In the first step, a first thermoplastic material is injection molded onto a mandrel and the resulting parison then is transferred to the second step wherein a second thermoplastic material is injection molded onto the first thermoplastic material. When the composite article is to have more than two layers, the two-layer parison is transferred to a third injection mold, and a third thermoplastic material is injection molded onto the two-layer parison. The injection molding step then is repeated for as many times as is necessary to obtain a parison having the desired number of layers. The final injection mold is then opened and the resultant multi-layer parison is transported to a blowing step on the mandrel wherein the multi-layer premold is expanded under fluid pressure. In the last step, which can take place in the same station as blowing, the multi-layer final article is then cooled and removed from the mandrel under fluid pressure.

Between the steps of injecting one layer on top of another layer, it is desirable to provide a conditioning stage, in order to cool at least a portion of the lower layer parison to sufficient rigidity. In this manner, when the next layer is injected on top of a cooled portion of the lower layer, the stream of hot plastic under high pressure will not erode the lower layer as it might if the lower layer was still relatively hot and thus not sufficiently rigid. Further, such cooling of the lower layer may prevent chemical bonding between layers which bonding is often considered undesirable.

If the available heat content of the top layer is sufficiently high, the cooled lower layer may be reheated by the top layer to a temperature sufficient for the blow molding operation. On the other hand, a heating step may be necessary to heat the cooled lower layer to its working temperature.

A more detailed explanation of the invention is provided in the following description and claims, and is illustrated in the accompanying drawings.

BRIEF DESCRIPTION OF THE DRAWINGS

The invention will be more fully described with reference to the accompanying drawings in which:

As shown in FIG. 1, the molding apparatus comprises a turntable 1 having on each side of its periphery a plurality of mandrels 2 shaped to form a parison 3 and a multi-layer parison 4. While a plurality of mandrels are shown, a single mandrel could, of course, be used.

Figure 1:
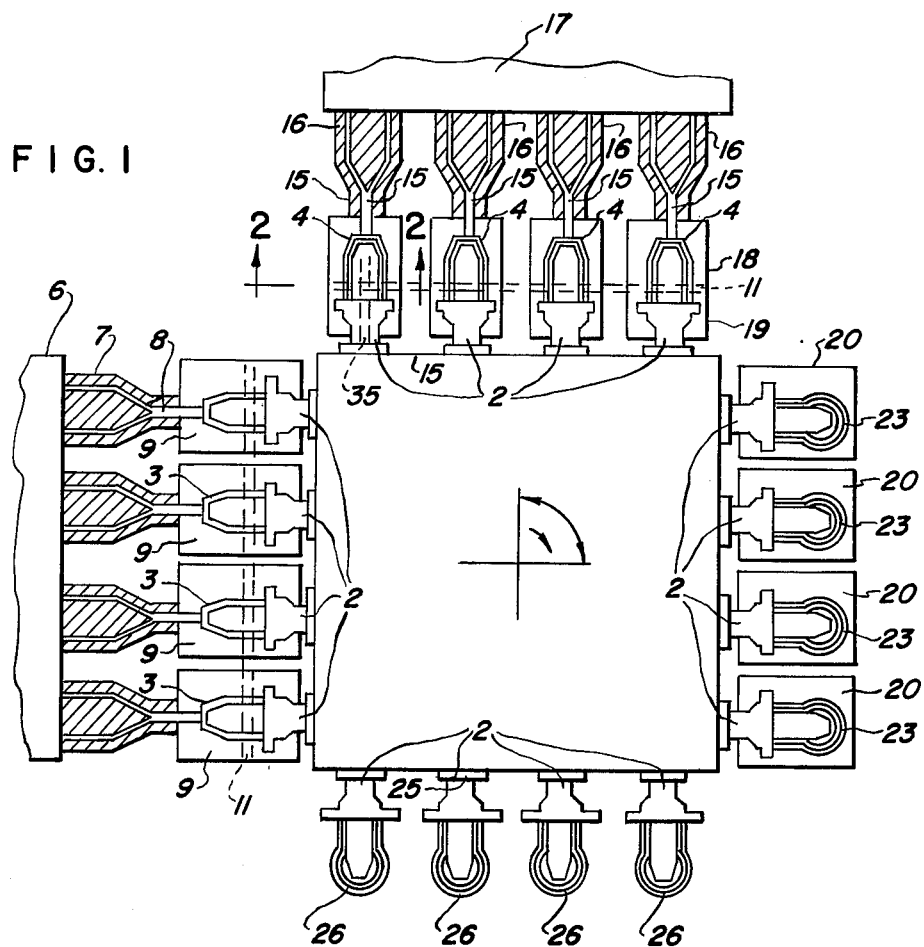
FIG. 1 is a top sectional view of an apparatus for injection molding two thermoplastic materials followed by blow molding.

In the first step, thermoplastic material is heated in heater 6 to its working temperature and is injected into the manifold 7 and injection nozzles 8. The plastic is introduced into the space between the molds 9 and the mandrels 2 to form the parisons 3. Each of the molds 9 is formed from two mating mold sections, each mold section being provided with conduits 10 and 11 for passing a fluid therethrough thereby maintaining the temperature of the parison as desired.

After the parison 3 is formed, the mold sections are removed from contact with it. The turntable 1 then is turned through an appropriate angle, which is 90° in the apparatus of FIG. 1, so that the parisons 3 are contiguous with the injection nozzle 15. The injection nozzles 15 are associated with the heater nozzles 16 and a heater 17 as well as conduits 18 and 19 in the manner described above for the first injection molding step. A second plastic material is injected over the parison 3 in the second injection molding step. The multi-layer parison 4 is formed from two thermoplastic materials which need not be adherent but may have similar working temperatures and preferably should not react chemically with each other at their molding temperature.

After the multi-layer parison is formed, the turntable 1 then is turned through an appropriate angle so that the multi-layer parisons 4 are contiguous with the corresponding blow molds 20. When the parisons 4 have arrived at the blow molding step, fluid under pressure is introduced through the center of the mandrel 2 through conduit 22 to expand the parison 4 to the desired final form 23.

After the expansion has been completed, the blow molds 20 are separated into two sections in the same manner as the injection molds thereby exposing the final form multi-layer product to the atmosphere. The turntable 1 then is again turned through an appropriate angle to pick-off station 25. At the pick-off station 25, the final articles have solidified so that they are no longer expandable under fluid pressure. A fluid is then introduced through the conduit 22 through the center portion of the mandrels 2 into the final article 26 to be blown from the mandrel into a collection station, now shown. The turntable 1 then is again turned so that the mandrels 2 are again presented to the injection nozzle 8 to repeat the cycle as described. While we have described the article as being blown from the mandrels 2, it will be, of course, understood that other methods of removal may be used.

Figure 2:
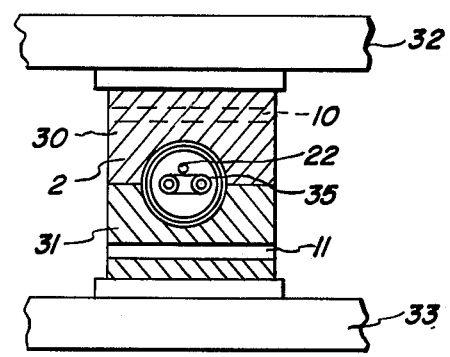
FIG. 2 is a vertical cross-section view of a mold when it is closed around a mandrel, taken along the line 2—2 of FIG. 1.

Referring to FIG. 2, the molds employed at the injection molding steps have identical interior configurations while the mold in the blow-molding step has the shape of the final article desired. However, in each step, the mold comprises a top mold section 30 and a bottom mold section 31 attached respectively to platens 32 and 33. In either the blow molding or injection molding steps, the mandrel 2 is brought into position when the mold sections 30 and 31 are apart. After the mandrel has been positioned, the mold sections 30 and 31 are brought together by pressure exerted on platens 32 and 33 so that the mandrel 2 is enclosed by the mold. When the mold sections 30 and 31 are closed, the conduits 10, 11, and 35 are aligned with a source of heating or cooling fluid, not shown, so that during either the blow molding or injection molding steps fluid is passed through these conduits either to heat or cool the parison of the final article. In the blow-molding step, after the article has been expanded, it is sufficiently cooled so that when transferred to the pick-off station it remains intact.

When a final article with more than two layers is desired, the number of injection molding steps is increased. Thus, for forming a three layer article, a 5-sided turntable is used, and the turntable is turned 72° between each step of the process. When a 4-layer article is desired, the turntable will have 6 sides, and the table is turned 60° between each step of the process, and similarly for fabricating articles with more than 4 layers.

Particularly suitable thermoplastic materials for use with the present invention include polyethylene with Saran (polyvinylidene chloride), acrylics with acrylonitrile-ethlacrylate copolymer (2. g., Barex 210), polystyrene with Barex 210, polypropylene with Barex 210, or a cellulosic such as ethyl cellulose, cellulose acetate, cellulose acetate-butyrate, cellulose propionate or the like with Barex 210.

Figure 3:
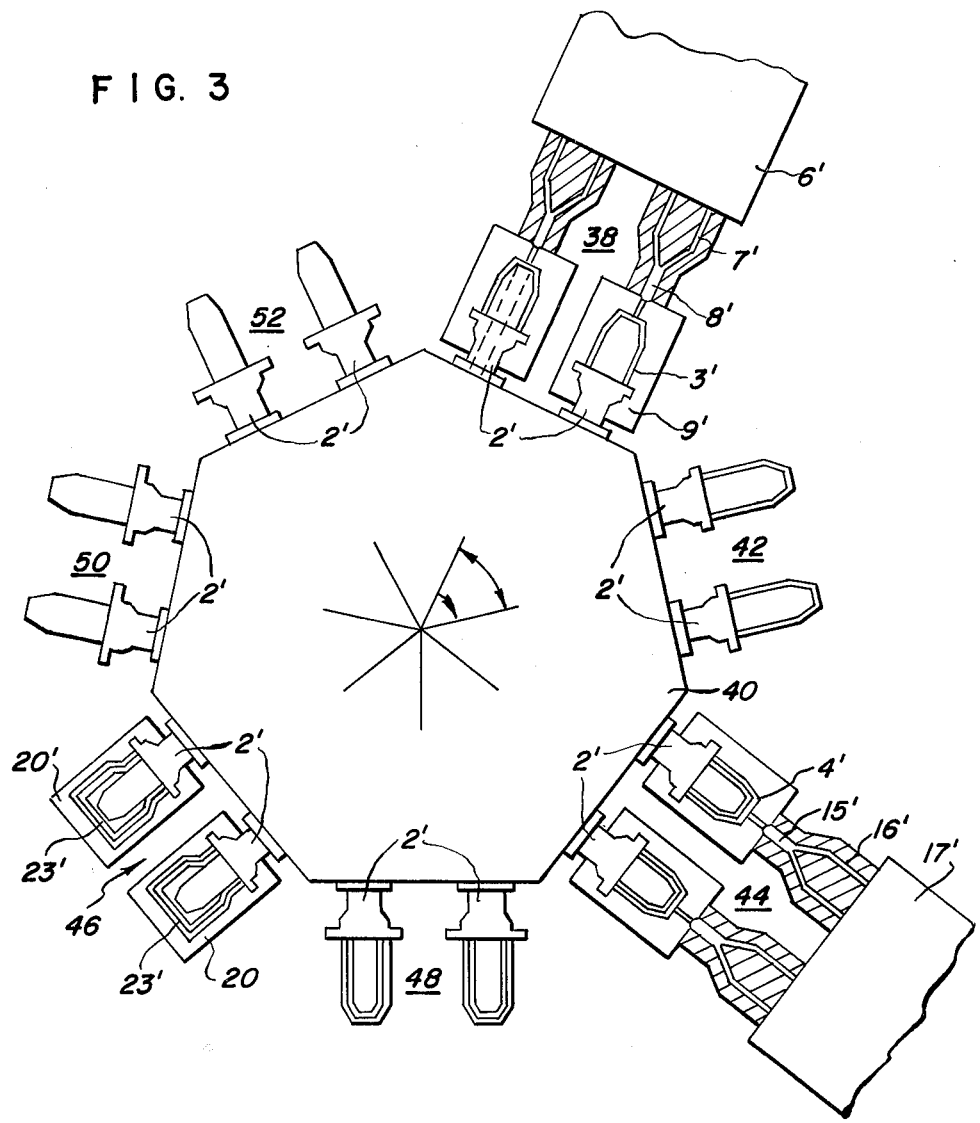
FIG. 3 is a top sectional view of a second embodiment of an apparatus for injection blow molding two thermoplastic materials followed by blow molding.

Referring to FIG. 3, a seven-sided turntable 40 is shown therein having on each side of its periphery two mandrels 2' shaped to form a parison 3' and a multi-layered parison 4'. The particular number of mandrels carried by each side of the turntable is merely a matter of choice or design.

In the first injection step 38, thermoplastic material is heated in heaters 6' to its working temperature and is injected into the manifold 7' and injection nozzles 8'. The plastic is introduced into the space between the molds 9' and the mandrels 2' to form the parisons 3'. Each of the molds 9' is formed from two mating mold sections, each mold section being provided with cooling channels for the passing of fluid therethrough for maintaining the temperature of the parison as desired.

After the parison 3' is formed, the mold sections are removed from contact with it. The turntable 40 then is turned through an appropriate angle, which is 51-3/7° in the apparatus of FIG. 3, to a conditioning station 42. The conditioning station has been found to be desirable because when the second layer is injected on top of parison 3' the stream of hot plastic under high pressure may erode parison 3' if parison 3' has not obtained sufficient heat loss by cooling. Thus, an intermediate conditioning station 38 is provided between the first and second injection stations in order to cool, to sufficient rigidity, at least the portion of the first layer parison on which the second layer is to be injected.

Conditioning station 42 may comprise a chill plate for cooling at least a portion of the first layer parison 3'. The cooling in certain instances could be effected by circulating cooling fluid through the mandrel. In another method, the parison could be refrigerated or else air cooling can be utilized where sufficient, without requiring a separate conditioning station.

By using a cooling step, the various layers of plastic need not be workable in the same temperature range. For example, if the inner layer material has lower required injection temperature than the second layer, the inner layer parison 3' can be cooled to a temperature below its normal working range. Heat from the second layer will then diffuse into this cool layer and reheat it. By correctly designing the variables, such as degree of cooling, temperature and size of the second layer injection and cycling time, the first layer can be brought back to its proper working temperature without sufficiently cooling the second layer down below its working range.

Thus, referring to FIG. 3, after parison 3' has been cooled in conditioning station 42, the turntable 40 is turned to second injection station 44. In injection station 44, thermoplastic material is heated in heaters 17' to its working temperature and is injected into the heater nozzles 16' and injection nozzle 15' so that the second plastic material will be injected over the parison 3' in the second molding step. The multi-layer parison 4' is formed from the two thermoplastic materials.

If the available heat content in the second layer is sufficiently high, the relatively cool first layer will be reheated by the second layer to a temperature adequate for the blow molding operation. On the other hand, if the available heat content in the second layer is not sufficiently high, another conditioning station 48 will be needed between the second injection station 44 and the blow molding station 46, in order to reintroduce heat into the first layer.

It can be seen that conditioning station 48 is provided between second injection station 44 and blow molding station 46. The second conditioning station 48 is utilized to reintroduce heat into the first layer when necessary and such reintroduction of heat may be obtained either by circulating a hot fluid through internal channels in the mandrel, by high frequency induction heating of the mandrel using an external coil, or by dielectric heating of the first layer using a high frequency which will generate heat mostly in the first layer. The dielectric heating method will only be possible if the dielectric characteristics of the layers are different enough on some frequency range to enable selective heating.

As stated above, certain materials will not require conditioning station 48 because heat from the second layer will be sufficient to reheat the first layer. However, if the working temperature of the first layer material is higher than the working temperature of the second layer materials, it is not possible to reheat the first layer by the latent heat in the second layer injection. Likewise, it is not possible to reheat the first layer if other processing parameters do not allow sufficient time for proper heat transfer, even if enough latent heat is available. It is, therefore, necessary to reheat the first layer parison 3' in conditioning station 48 in one of the manners described above. Although production of a two layered article is shown in FIG. 3, it is to be understood that the present invention is also useful with the manufacture of three or more layered articles.

Referring back to FIG. 3, after the two layered parison 4' is conditioned for further working in conditioning station 48, turntable 40 then is turned so that the two layer parisons 4' are contiguous with the corresponding blow molds 20'. When the parisons 4' have arrived at the blow molding step, fluid under pressure is introduced through the center of the mandrel 2' to expand the parison 4' to the desired final form 23'. After the expansion has been completed, the blow molds 20' are separated into two sections in the same manner as the injection molds thereby exposing the final form multi-layer product at the atmosphere. The turntable 40 is then again turned through an appropriate angle to ejection station 50. At ejection station 50, the final articles have solidified so that they are no longer expandable under fluid pressure. Fluid is then introduced through the center portion of the mandrels 2' into the final article, to eject it from the mandrel into a collection station.

It may be necessary in some cases to provide a conditioning station 52 between the ejection station 50 and the first injection station 38, in order to bring the mandrel temperature to the proper level for the first stage injection.

In the production of bottles, the mandrels utilized are relatively long and slender and since it is virtually impossible to obtain absolutely even flow of plastic into the mold cavity during the first injection station, the mandrel will be subjected to elastic bending. Such bending is of little consequence in the production of typical one layer bottles, since the amount of bending represents only a small fraction of the parison wall. On the other hand, with a relatively thinwall parison, the bending is substantial enough to cause marked eccentricity of the parison. In the blowing stage, this could lead to uneven wall thickness or may result in rupture of the inner layer.

In order to alleviate the eccentricity problem, it is preferred to utilize a mandrel that is formed from a material with a high elastic modulus. One possibility is tungsten which has an elastic modulus of $51.6 \times 10^6$ pounds per square inch and another material which could be used is cobalt-infiltrated tungsten which has an elastic modulus of between $70 \times 10^6$ pounds per square inch and $90 \times 10^6$ pounds per square inch. As a comparison, conventional mandrels are formed of steel having an elastic modulus of about $30 \times 10^6$ pounds per square inch. Since bending at a given stress is inversely proportional to the modulus, it is thus possible to significantly reduce the bending of the mandrel by utilizing a mandrel formed from a material with a very high elastic modulus.

Another system for alleviating the eccentricity problem is by securing the tip of the mandrel relative to the mold during the initial portion of the injection to physically maintain the mandrel properly centered in the mold cavity. The thermoplastic material would be injected from the neck of the mandrel, instead of from its tip and as injection progresses the device is withdrawn to enable plastic to flow freely in its place.

Although preferred illustrative embodiments of the invention have been shown and described, it is to be understood that various modifications and substitutions may be made by those skilled in the art without departing from the novel spirit and scope of the present invention.

What is claimed is:

1. A process for molding multi-layer plastic articles formed from at least two thermoplastic materials which comprises the steps of:
   a. providing a first injection mold about a mandrel;
   b. thereafter injecting a first heat-plasticized thermoplastic material into said mold and onto said mandrel to form a first parison;
   c. thereafter withdrawing said mandrel and first parison from said first injection mold after the parison is formed;
   d. thereafter cooling at least a portion of said parison on which a second layer is to be injected, to a temperature below the normal working range of said first thermoplastic material in order to prevent erosion of the first parison by subsequent injection of a second layer thereon;
   e. thereafter providing a second injection mold about said mandrel and first parison;

f. thereafter injecting a heat-plasticized thermoplastic material onto said first parison to form a second layer parison;

g. thereafter transferring said second layer parison on said mandrel to a blow mold;

h. thereafter blow molding said second layer parison in said blow mold to form an article; and i. thereafter removing said article from said mandrel.

2. The process of claim 1, including the step, after the second layer parison is formed on said mandrel, of withdrawing said mandrel and second layer parison from said second injection mold and thereafter heating said second layer parison so that said first thermoplastic material and said second thermoplastic material are both at a temperature that is high enough for subsequent blow molding thereof.

3. The process of claim 1, wherein said first layer parison is cooled by a chill plate located at said cooling stage.

4. The process of claim 1, wherein said first layer parison is cooled by circulating fluid through said mandrel at said cooling stage.

5. The process of claim 1, wherein said first layer parison is cooled by refrigeration at said cooling stage.

6. The process of claim 1, wherein said first layer parison is air cooled at said cooling stage.

7. A process for molding multi-layer plastic articles formed from at least two thermoplastic materials which comprises the steps of: injecting a first heat-plasticized thermoplastic material onto a mandrel in an injection mold to form a parison; removing said injection mold after the parison is formed; thereafter cooling at least a portion of said parison on which another layer is to be injected, to a temperature below the normal working range of said first thermoplastic material in order to prevent erosion of the first parison by subsequent injection of another parison layer thereon; transferring said parison to at least one additional injection mold; injecting a heat-plasticized thermoplastic material onto said parison at each additional injection molding step to form a multi-layer parison; after each parison is formed removing the injection mold and cooling at least a portion of the parison formed between each injection step so that at least a portion of the top layer, prior to injection of the next injected layer, is at a temperature below the normal working range of the thermoplastic material from which the parison is formed in order to prevent erosion of the formed parison by subsequent injection of another parison layer thereon; transferring said multi-layer parison on said mandrel to a blow mold; blow molding said multi-layer parison in said blow mold to form an article; and removing said article from said mandrel.

* * * * *